Aug. 30, 1966      J. B. WILEY      3,270,231
DYNAMOELECTRIC MACHINE MEANS
Original Filed July 29, 1964

INVENTOR.
John B. Wiley
BY
His Attorney

INVENTOR.
John B. Wiley
BY
Albert H. Reuther
His Attorney

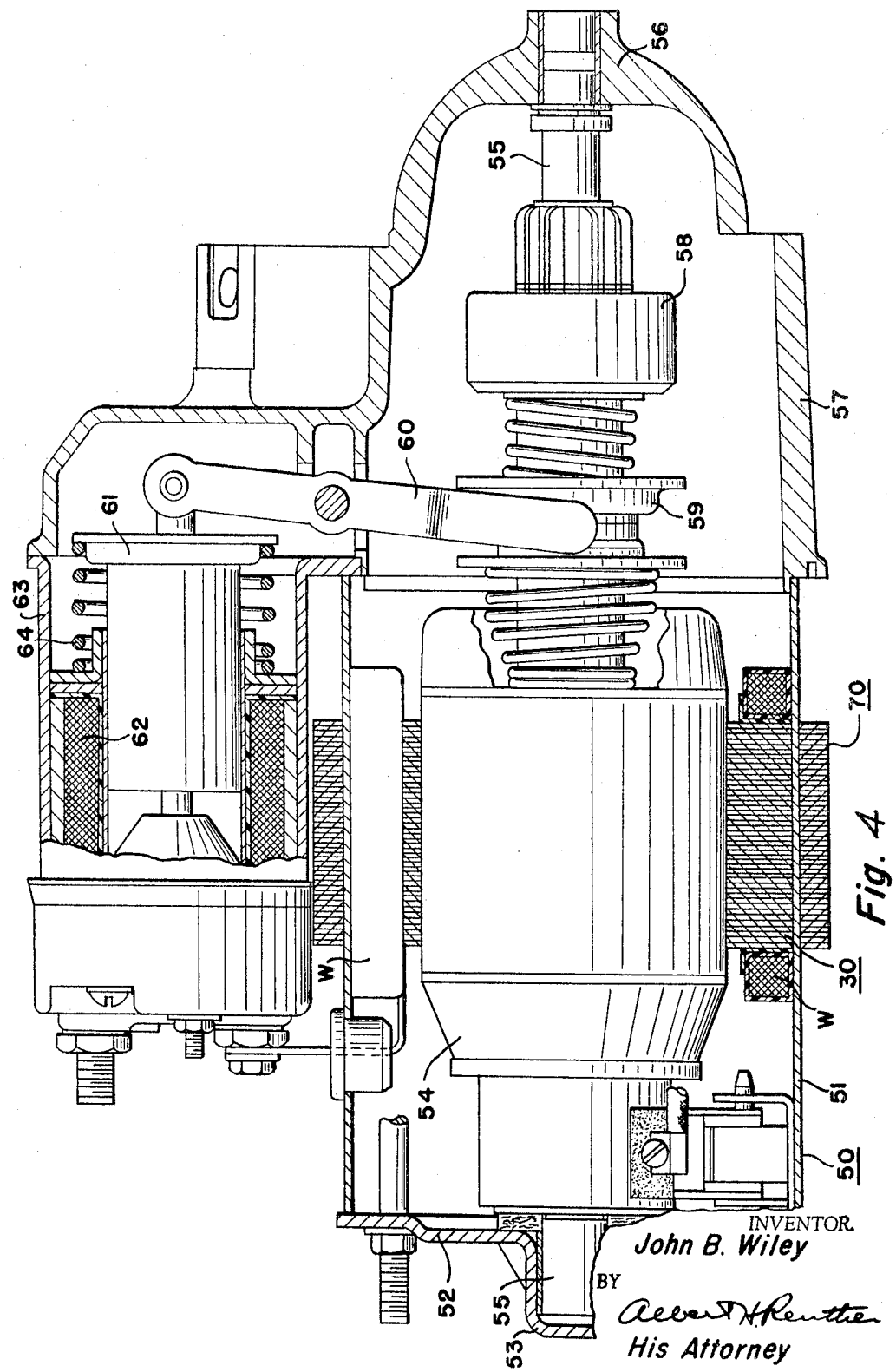

INVENTOR.
John B. Wiley

United States Patent Office 3,270,231
Patented August 30, 1966

3,270,231
DYNAMOELECTRIC MACHINE MEANS
John B. Wiley, London, Ontario, Canada, assignor to General Motors Corporation, Detroit, Mich., a corporation of Delaware
Original application July 29, 1964, Ser. No. 385,940, now Patent No. 3,225,424, dated Dec. 28, 1965. Divided and this application Sept. 1, 1965, Ser. No. 484,357
5 Claims. (Cl. 310—259)

This is a division of my co-pending application S.N. 385,940, Wiley, filed July 29, 1964, now Patent 3,225,424, Wiley, issued December 28, 1965, which is a continuation-in-part of U.S. patent application S.N. 70,262, Wiley, filed November 18, 1960, now U.S. Patent 3,188,505, Wiley, issued June 8, 1965 and belonging to the assignee of the present invention.

This invention relates to dynamoelectric machine means, and, more particularly, to layered formation of components thereof.

An object of this invention is to provide a new and improved structural arrangement for stator and rotor components of dynamoelectric machines. A saving in laminating material is realized. Also there is standardization of laminating material. The same laminating material is useful both for inside-out arrangement of stator and rotor components as well as vice versa in outer stator with central rotor arrangement thereof.

Another object of this invention is to provide dynamoelectric machine stator and rotor lamination structures each involving a laterally slotted longitudinal strip. This strip is notched in locations intermediate to the slots. The slots become substantially longitudinally aligned to each other in predetermined numbers upon assembly of notched strip onto an annular member as a mounting therewith, the slots having winding means therein.

A further object of this invention is to provide dynamoelectric machine stator and rotor lamination structures each including an annular support as well as slotted lamination means press-fitted thereto. The lamination means have a body portion arcuate in configuration as bent from a continuous strip. The strip has a plurality of slots initially small in area to save waste of material. The slots are then enlarged as to open area when teeth therebetween are caused to spread from each other adjacent to free radially outer ends thereof. There are notches along radially inner edging in alignment with slots and intermediate the teeth. Such notches facilitate bending and simultaneously provide a reluctance air gap free of open slots from which windings can dislocate. An identical strip material can be used both for stator as well as rotor structures. The windings tend to push into depth of the slots rather than out of any inner openings of the laminated configuration.

Another object of this invention is to provide for assembly of an alternator means on which a thick and heavy frame is eliminated by use of a "tin-can" housing. The alternator means has an externally mounted edge-wound spiral yoke of metal radially aligned on an annular thin metal body portion of the "tin-can" housing. This thin metal body portion fits along the inner periphery of the edge-wound spiral yoke. The thin metal body portion is complementary also to an internally secured edge-wound spiral stator means slotted to receive coil assembly therewith radially between the external yoke and a central rotor means. This rotor means is suitably journaled by end portions sealingly secured to ends of the annular thin sheet metal body portion.

Further objects and advantages of the present invention will be apparent from the following description, reference being had to the accompanying drawings wherein preferred embodiments of the present invention are clearly shown.

In the drawings:

FIGURE 4 is a sectional elevational view of a dynamoelectric machine or cranking-starter motor having spiral strip and stator housing portions arranged with features in accordance with the present invention.

Figure 1:
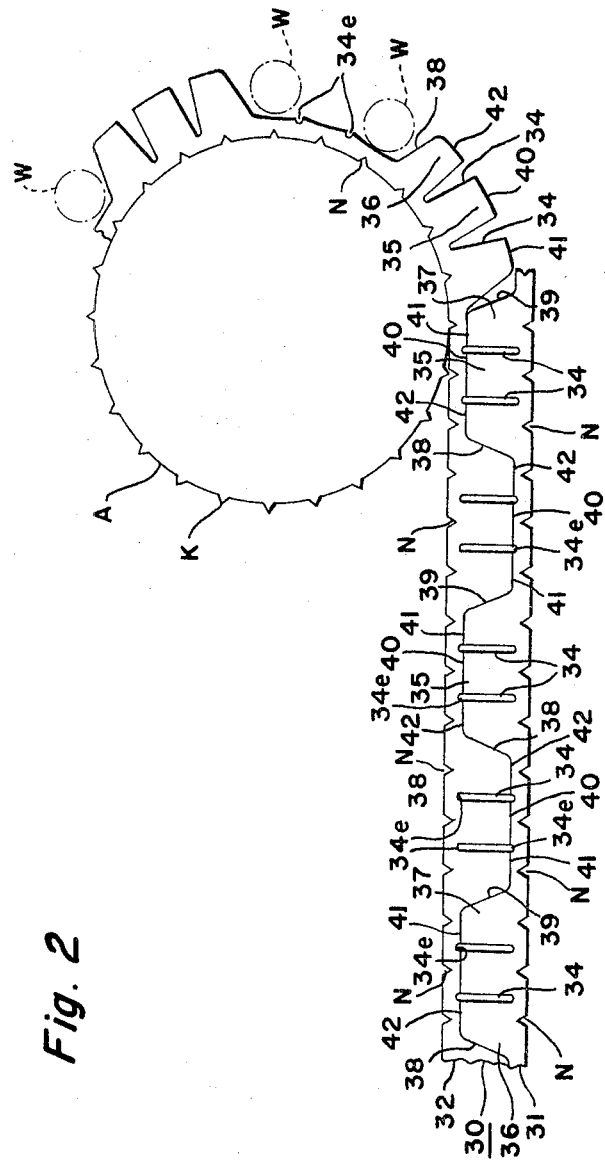
FIGURE 1 is a view showing changing of metal strip means having notching and cutting features for keyed-arbor spiral formation of dynamoelectric machine components to be fitted with winding means in expanded opening or slot locations.

In FIGURE 1 there is a metal strip means generally indicated by numeral 30 including opposite complementary first and second continuous edging portions 31 and 32. Each of the edging portions 31 and 32 has a plurality of notches or notching N only along one side or edge thereof subject to subsequent engagement of keying K provided on an outer periphery of an arbor A as indicated in FIGURE 1. This arbor A can be seen in greater detail in views of FIGURES 6 and 7 of the copending S.N. 385,940, Wiley, filed July 29, 1964 and Patent 3,188,505, Wiley, issued June 8, 1965 as noted earlier.

Figure 2:
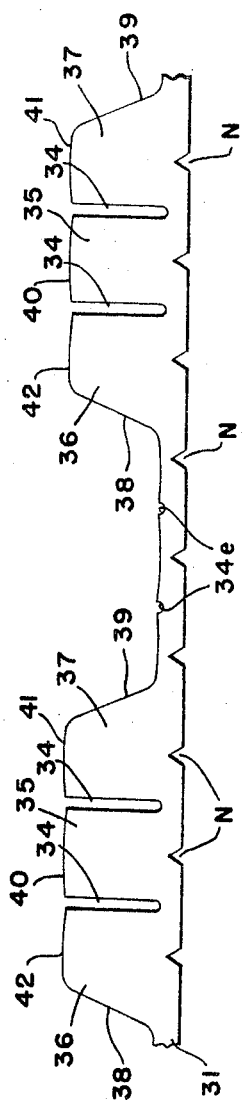
FIGURE 2 is an enlarged fragmentary view of one portion of the metal strip means of FIGURE 1.

The strip means 30 of FIGURE 1 further includes transverse cutting or pairs of transverse slots 34 located mainly on opposite sides of an intermediate tooth or pole segment 35 as well as end teeth or pole segments 36 and 37 as illustrated in views of FIGURES 1 and 2. Only very short notch-like endings 34e complementary to the cutouts or slots 34 remain in the opposite edging portions 31 and 32 and these are in alternate positioning as to the notches N. The strip means 30 can be progressively stamped by a suitable die structure and arrangement such that the opposite outer peripheral edges having the notches N therein require no subsequent machining or grinding operation. Similarly a die cutting operation can occur to form a truncated-cone-like opposite pole or collective tooth formation including provision of angularly or slanted cuts 37 and 38. A slightly curved or semi-arcuate cut 40 is made for each intermediate tooth segment 35 adjacent to opposite edging portions 31 and 32. Further arcuate cuts 41 and 42 are made for tooth segments 37 and 36 respectively for each of the opposite complementary portions integral with the edging portions 31 and 32. These curved or arcuate cuts 40, 41 and 42 are shown enlarged in a view of FIGURE 2. The cuts collectively become an annular outer periphery of circular configuration without requiring further machining, grinding or cutting as a result of bending of the strip portions around arbor means as shown in a right hand portion of FIGURE 1 of the drawings. Once the continuous spiral lamination assembly is formed on such arbor means, the segments 35–36–37 collectively can form electrical poles subject to fitting of winding means W into openings or expanded slot locations therebetween as indicated in FIGURE 1. The notching N as well as the slot ends 34e as well as the cutting or slots 34 facilitate bending into a continuous spiral and arcuate configuration.

Figures 3A, 3B:
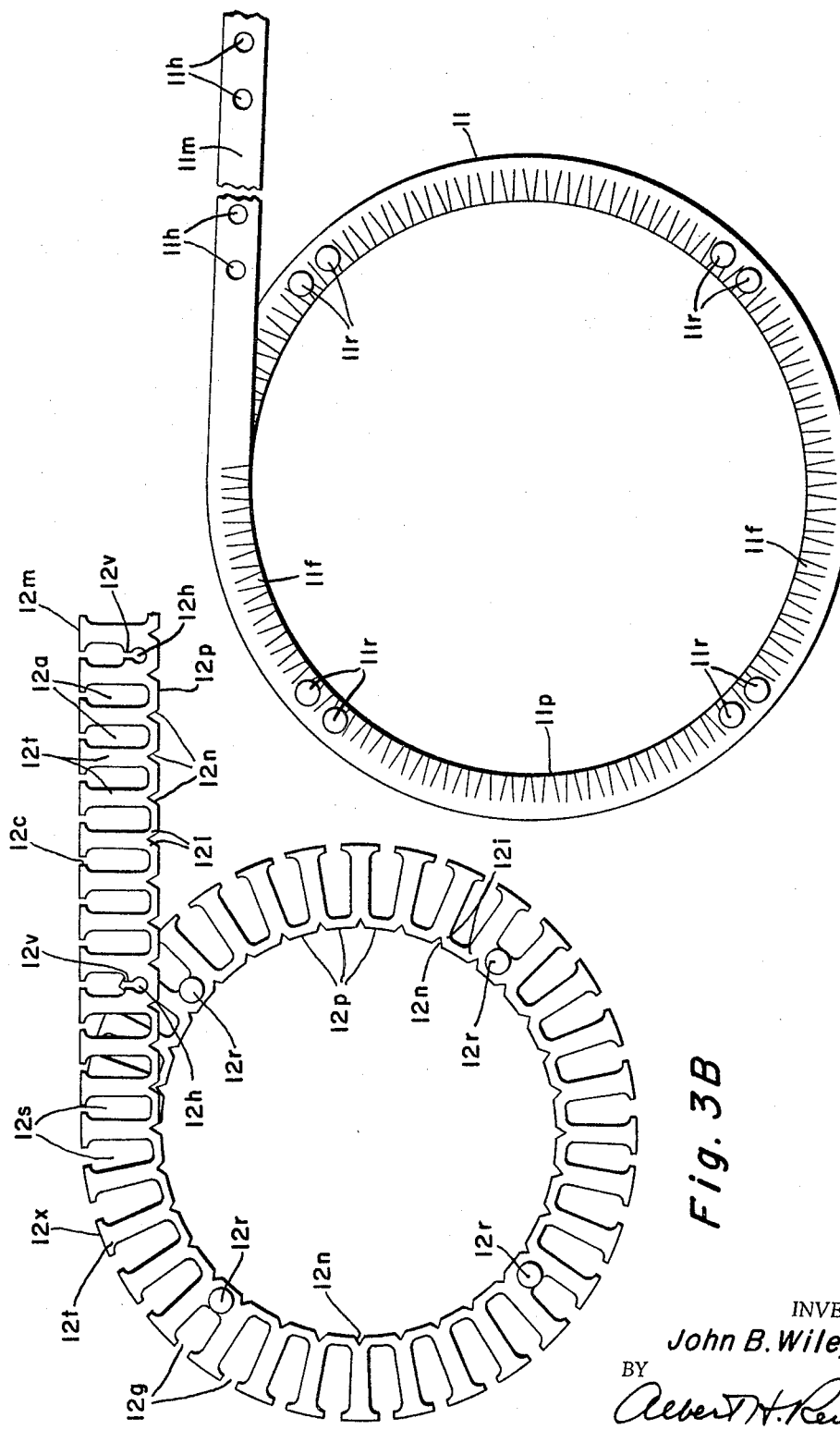
FIGURE 3A is an elevational view of one portion of one of the components in FIGURE 1 of U.S. Patent 3,188,505 noted earlier.
FIGURE 3B is an elevational view of another portion of the same component.

FIGURE 3A corresponds to FIGURE 2 in Patent 3,188,505 noted earlier and illustrates a core portion 11. This core portion 11 is formed from a straight continuous strip of sheet metal indicated by reference numeral 11m and having predetermined holes 11h punched therethrough at predetermined intervals such that the metal strip 11m can be bent into a generally spiral and arcuate configuration including a plurality of flutes 11f that extend generally radially for at least one half the width of the metal strip and that becomes nested progressively as the strip material 11m is continuously bent into a predetermined stack-up. Suitable fastening means such as rivets 11r can be inserted through holes such as 11h and serve to hold the core portion 11 in an arcuate subassembly having a radially inner periphery 11p. FIGURE 3B corresponds to FIGURE 4 in Patent 3,188,505 noted earlier and illustrates a slotted strip portion further made of arcuately bent strip material prepunched in predetermined longitudinal sequence to define a plurality of metal teeth 12t each located between a pair of laterally open apertures 12a. Each of the teeth 12t has a notch 12n formed substantially in lateral alignment therewith in locations intermediate pairs of apertures 12a. Periodically an aperture such as 12a is made to have slightly less width or depth so as to permit formation of holes such as 12h through which rivets 12r can be secured for fastening the slotted portion 12 into an arcuate subassembly. The apertures 12a as well as the notches 12n and holes 12h are punched into a continuous longitudinally extending metal band 12m of relatively ductile material such as silicon steel made readily bendable by provision of the notches 12n which are in alignment with each of the teeth 12t. It is to be understood that strip material of the band 12m between the notches 12n forms a radially inner periphery 12p composed of a plurality of segments or sections designated collectively by reference numerals 12p. Each of these peripheral segments 12p is joined at opposite ends by an intermediate segment 12i that serves as a bendable hinge such that the apertures 12a as originally punched can have a smaller area than slots 12s. The slots 12s are larger in area due to angular separation of transversely extending ends 12x of each of the teeth 12t. Initial end cuts 12c adjacent to one side of each of the apertures 12a can expand into relatively larger gaps 12g through which winding means can be inserted. To assure even arcuate bending of the strip material 12m throughout the length thereof including locations where the holes 12h for the rivets are located, there is provided a lateral slit or void 12v, thereby permitting the cuts 12c to be expanded uniformly into larger gaps 12g. The advantage of the strip means of FIGURES 1 and 2 is that machining is eliminated by stamping or die forming the strip means to have curvature or radii along the top edging of the teeth. The spiral strip means illustrated in FIGURES 1 and 2 can be used in a dynamoelectric machine or cranking-starter motor illustrated in the view of FIGURE 4 of the drawings. Such a dynamoelectric machine or cranking-starter motor is generally indicated by numeral 50 having a thin metal or "tin-can" body portion 51 visible in FIGURE 4. An end portion 52 sealingly engages one end of the body portion 51 and includes a central hub or shaft journaling portion 53. An armature assembly 54 carried on a shaft 55 as shown in FIGURE 4 can be journaled at one end on this hub portion 53 and at an opposite end can be journaled in a bearing portion 56 of a motor or starter drive housing end means 57. The shaft 55 can carry a drive clutch means 58 as well as suitable spring means on opposite sides of a shiftable member or pulley 59. This shiftable member or pulley 59 is engaged by a centrally pivoted lever 60 journaled at one end to a plunger assembly 61. The plunger assembly 61 is axially reciprocable in a bore or central passage of a solenoid means 62 retained in a housing or auxiliary mounting portion 63. A return spring 64 can be provided to bias the shift lever 60 and plunger assembly 61 in a well known manner. Previously a large and thick main frame was required and used whereas now a relatively thin sheet metal or "tin-can" body portion 51 is mounted to be sealingly engaged against the housing end means 57 at one end and the end portion 52 at an opposite end. In accordance with the present invention, a stator winding means W is fitted to slots of spiral strip means generally indicated by numeral 30 in FIGURE 4. This illustrates provision of one of complementary portions formed from such strip means into an arcuate and continuous spiral configuration by use of an arbor A as indicated in FIGURE 1. This spiral strip means having notching as well as the pole-forming tooth portions 40, 41 and 42 can be press-fitted and secured directly to an inner periphery of the thin sheet metal or "tin-can" body portion 51 in a location radially outwardly from the rotor means or armature assembly 54. Located radially outwardly from the spiral strip means 30 and along an outer periphery of the body portion 51 there is a solid continuous spiral yoke means generally indicated by numeral 70. This yoke means 70 is also edge wound as shown in FIGURE 2 of the copending disclosure and patent noted earlier. However, now the yoke means is located radially outside the body portion 51 which is tightly and snugly held radially in an intermediate location between the yoke means and the spiral strip means 30. The notches N are provided on the spiral strip means 30 as the wound stator component requiring no machining and also having no large and thick frame or body portion required. Testing of a cranking-motor or dynamoelectric machine as shown in FIGURE 4 was conducted before and after such notches were machined into pole shoe structure. Notches in the pole shoes were not harmful to motor performance and the motor even tested more favorably after the notches were made. The notches along an edge of the strip means are made to be substantially the same width as a slot would be. As a result there is an effect a full tooth face without a short circuiting ring of metal completely continuous all the way around. Due to distance between the notches, there is a split flux pattern electrically possibly partially effected by having a slot present and the main purpose of the notches is to permit keying or tooth-like sprocket projections to mate exactly therewith and to permit stretching or elongating of metal to correct annular distance at each and every keying location as to the notches. Thus a proper alignment is accurately achieved in accordance with the sprocket or arbor keying due to friction or traction engagement therebetween.

Provision of the yoke means 70 externally without machining is advantageous since the stator core can be supplemented or augmented with an anguloid or spiral strip means both radially outwardly and radially inwardly on opposite sides of the thin sheet metal or "tin-can" body portion 51. A greatly reduced cost is realized due to savings in machining operations, capital expenditure for expensive machining equipment as well as for frame materials per se. Such savings in material can be of particular value for mass production operations such as manufacture of an alternator or generator assembly.

Figure 5:
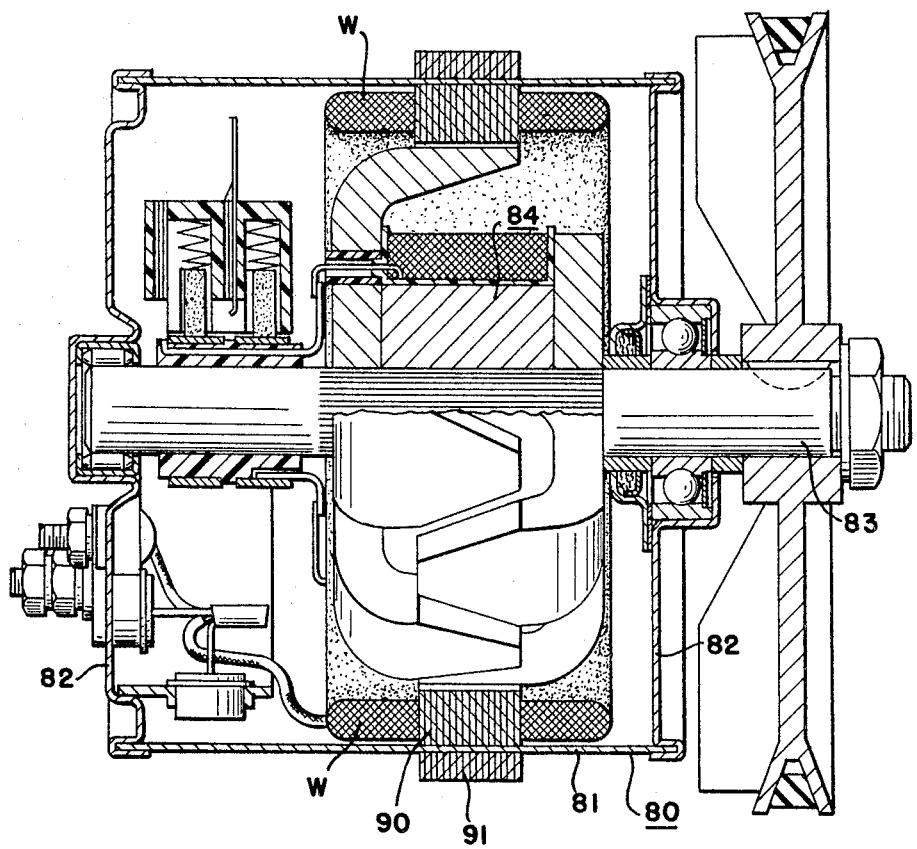
FIGURE 5 is a sectioned elevational view of another dynamoelectric machine or alternator-generator assembly incorporating features similar to those of FIGURE 4 and utilizing spiral strip and housing portion arrangement in accordance with the present invention.

FIGURE 5 illustrates features of the present invention provided on an alternator or generator assembly generally indicated by numeral 80 having a thin metal or "tin-can" body portion 81 as well as opposite end or lid portions 82. Suitable bearing means can be provided with these end portions for journaling of a shaft 83 carrying an armature or rotor assembly generally indicated by numeral 84. As to the housing means per se including the body portion 81 and end portion 82 reference can be made to a U.S. Patent 3,081,411, Wiley, issued March 12, 1963 and belonging to the assignee of the present invention. However, in each of the application and patent disclosures noted the stator assembly is entirely inside the frame or body portion whereas in accordance with the present invention the body portion such as 51 and 81 is located intermediate an external yoke means 70 indicated in FIGURE 4 and similar spiral yoke means 90 indicated in FIGURE 5. In FIGURE 5 also, winding means W can be fitted to a slotted spiral lamination structure 91. Savings realized from elimination of turning and machining as well as reduction of frame material make spiralling or edge-winding considerably more attractive for production purposes as facilitated by the notching.

While the embodiments of the present invention herein disclosed constitute preferred forms, it is to be understood that other forms might be adopted.

What is claimed is as follows:

1. A stator assembly for a dynamoelectric machine on which a thick and heavy frame is eliminated, comprising, a thin metal annular housing portion having ends secured thereto for journaling a rotor centrally thereof, a spiral radially inner slotted stator portion having winding means carried thereby and located radially intermediate the rotor and said thin metal annular housing portion, and an annular yoke portion complementary magnetically to said spiral stator portion, said yoke portion being entirely outside and spaced from said spiral stator portion though radially in alignment therewith.

2. The assembly of claim 1 wherein said housing portion has thin metal lid portions sealingly crimped to opposite ends thereof each with a bearing hub for journaling the rotor, said yoke being spirally edge wound.

3. The assembly of claim 1 wherein said yoke is spirally edge wound and said inner stator portion has poles collectively formed each with an intermediate portion between a pair of opposite tooth portions with an arcuate edging which complements annular configuration due to said spiral formation.

4. A metal strip made preparatory for spiraling thereof into a magnetic core component for a dynamoelectric machine by steps of notching an edge thereof in predetermined locations, cutting tooth portions which are integral with the strip and aligned with said notches, and arcuately bending said strip accompanied by hinging action due to said notches whereby stretching of metal strip occurs for accurate alignment of teeth.

5. The strip of claim 4 wherein groups of three teeth define electrical poles each with outer arcuate periphery divided by a pair of substantially transverse slots parallel to each other and expanded into a V-shape during said bending to have said arcuate periphery changed to a completely curved periphery.

References Cited by the Examiner
UNITED STATES PATENTS

| | | | |
|---|---|---|---|
| 1,919,995 | 7/1933 | Wry | 310—216 X |
| 1,920,354 | 8/1933 | Carpenter | 310—259 |
| 2,247,890 | 7/1941 | Reardon | 310—216 |
| 3,081,411 | 3/1963 | Wiley | 310—258 |

MAX L. LEVY, *Primary Examiner.*

MILTON O. HIRSHFIELD, *Examiner.*

L. L. SMITH, *Assistant Examiner.*